United States Patent [19]

Apstein et al.

[11] 4,064,806
[45] Dec. 27, 1977

[54] ULTRASONIC REMOTE CONTROL SYSTEM

[75] Inventors: Maurice Apstein, Bethesda, Md.; Henry P. Kalmus, Washington, D.C.

[73] Assignee: The United States of America as represented by the Secretary of the Army, Washington, D.C.

[21] Appl. No.: 719,861

[22] Filed: Sept. 1, 1976

[51] Int. Cl.² ............................................. F42C 17/00
[52] U.S. Cl. ............................................... 102/70.2 R
[58] Field of Search ..................... 102/70.2 R, 70.2 G, 102/70.2 GA, 18, 19.2; 89/1.5 D, 1.8, 1.813; 340/18 NC

[56] References Cited

U.S. PATENT DOCUMENTS

| 3,233,674 | 2/1966 | Leutwyler | 340/18 NC |
| 3,343,492 | 9/1967 | Kritz | 102/70.2 R |

Primary Examiner—Charles T. Jordan
Attorney, Agent, or Firm—Nathan Edelberg; Robert P. Gibson; Saul Elbaum

[57] ABSTRACT

Transmission of control information from one location in a solid structure to one or more remote locations in that structure is accomplished with ultrasonic surface waves transmitted along the structure. The ultrasonic carrier is frequency-modulated to cause the resulting standing wave patterns in the structure to be spatially shifted at the modulation frequency and thereby avoid permanent vibration nodes at receiver locations. The invention has particular utility in munitions structures.

9 Claims, 5 Drawing Figures

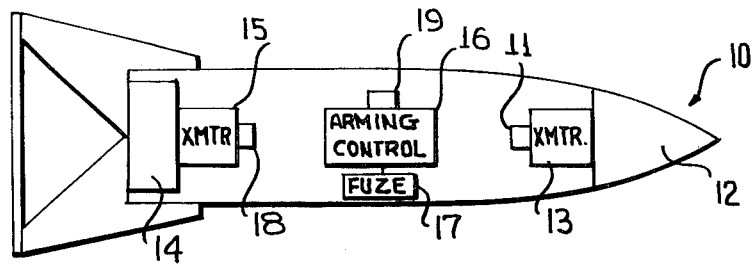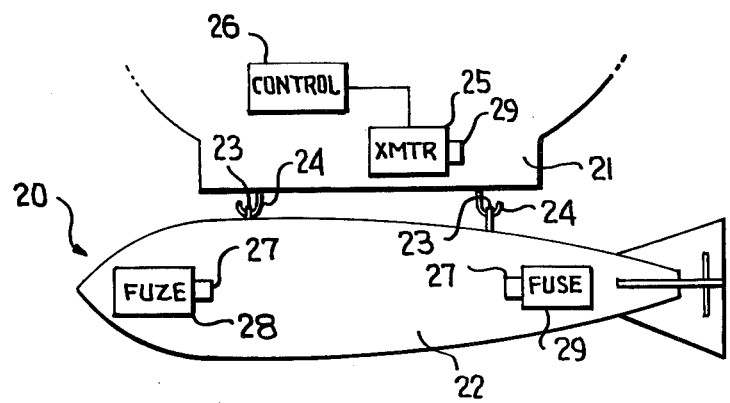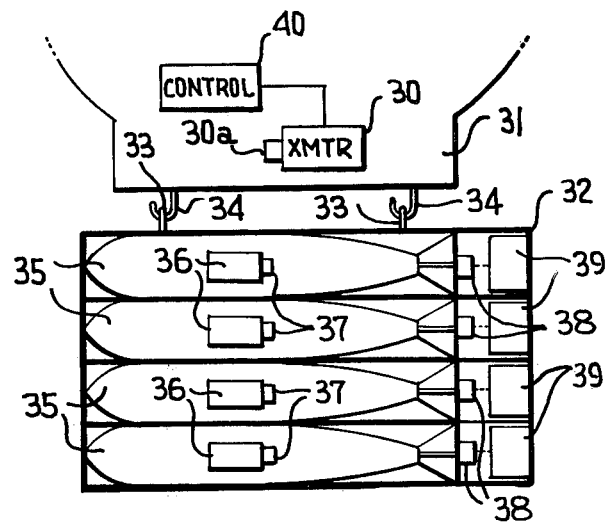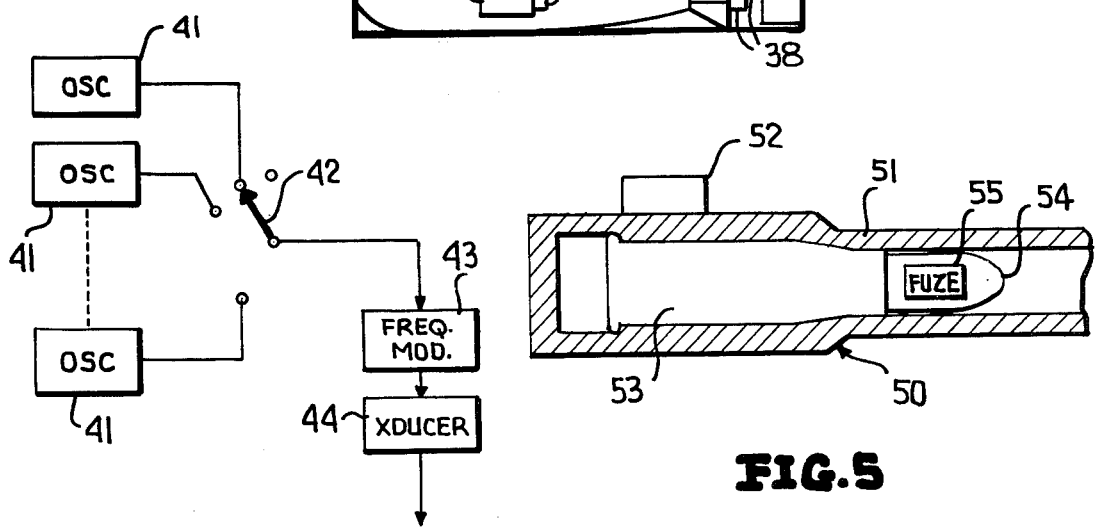

ULTRASONIC REMOTE CONTROL SYSTEM

RIGHTS OF THE GOVERNMENT

The invention described herein may be manufactured, used, and licensed by or for the United States Government for governmental purposes without the payment to us of any royalty thereon.

BACKGROUND OF THE INVENTION

The present invention relates to transmitting information from one location in a structure to one or more remote locations in a structure without using conventional transmission media such as electrical conductors, microwaves, etc.

It is often desirable to avoid conventional electrical transmission between a signal source and receiver. For example, it is highly desirable to arm and disarm a warhead-carrying missile by command signals without breaching the missile's skin to allow entrance of electrical conductors. In addition, it is desirable to control bomb fuzes without passing current near explosive material.

Although the invention hereinafter described relates primarily to arming and disarming a missile, it is to be understood that the utility of the invention is not so limited.

It is an object of the present invention to transmit control information from one location in a structure to one or more remote locations in that structure without using conventional transmission media but instead using the structure itself for transmission purposes.

The closest prior art known to applicants is U.S. Pat. No. 3,343,492 to Kritz. In that patent, command signals in the form of ultrasonic vibrations are transmitted through a missile's metal shield. It is important to note in Kritz that the electrical-to-mechanical transducer for the transmitter must be on the opposite side of the shield from the mechanical-to-electrical transducer for the receiver. In other words, the ultrasonic vibration used for transmission is in the thickness mode, through the shield, normal to the shield surface. The limiting factor here, and this is quite clear in Kritz, is that only one receiver can be used for each transmitter.

It is another object of the present invention to transmit control signals in the form of ultrasonic vibrations from one location in a structure to one or more remote locations in that structure.

SUMMARY OF THE INVENTION

In accordance with the present invention, transmission of ultrasonic signals through a structure is in the form of surface waves (transverse or longitudinal) which pervade the entire structure and permit reception at one or more locations on that structure which are far removed from the transmitter. A difficulty with this arrangement is that the surface waves set up standing wave patterns in which nodes (i.e. signal nulls) exist at locations determined by the particular ultrasonic frequency. If a receiver is located at such a node, no information can be received. In order to avoid the null problem, the ultrasonic carrier is frequency modulated, causing the standing wave pattern to spatially shift back and forth at the modulation frequency. This assures that a signal can be received at any location in the structure.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein:

FIG. 1 is a schematic representation of a remotely controlled missile capable of being armed in accordance with the present invention;

FIG. 2 is a schematic representation of bomb fuze arrangement adapted to be remotely controlled in accordance with the present invention;

FIG. 3 is a schematic representation of the present invention applied to a multiple-tube rocket launcher;

FIG. 4 is an electrical schematic diagram of a typical signal transmitter capable of application in the present invention; and FIG. 5 is a schematic representation of the present invention applied to a remote-set fuze arrangement in a tank gun or the like.

DESCRIPTION OF THE PREFERRED EMBODIMENT

Referring specifically to FIG. 1, a guided missile 10 is provided with a sensor 12 at its forward end and a sensor 14 at its tail end. These sensors may take a variety of forms, depending on the use. By way of example only, each sensor may be a small radio receiver of the type described in U.S. Pat. No. 3,063,345, which is arranged to receive radio signals and provide a d.c. control signal when in receipt of radio signals having prescribed characteristics. Alternatively, one or both sensors may comprise range measuring circuits which include a transmitter and receiver for transmitting RF pulses and receiving reflections thereof from a target; a signal would be provided by the sensor if the range between the missile and target is less than a predetermined range as determined by the time displacement between transmitted and received pulses. Further, sensor 12 may be an air speed sensor which provides a signal representative of the missile air speed to transmitter 13 which in turn generates an ultrasonic signal having a parameter (e.g. - frequency, modulation, etc.) which is a function of missile air speed. Similarly, sensor 12 may be an accelerometer which causes transmitter 15 to provide an ultrasonic signal indicative of missile acceleration. Other embodiments for sensors 12 and 14 are likewise possible, the important thing being that each sensor provides an output signal in response to a specified sensed condition.

The output signal from sensor 12 is applied to a transmitter 13; the output signal from sensor 14 is applied to transmitter 15. These transmitters may simply be ultrasonic oscillators which are actuated upon receiving the sensor output signal. Alternatively, the transmitters 13 and 15 may be plural ultrasonic oscillators (as described with reference to FIG. 4) which are selectively actuated in accordance with a parameter of the received sensor signal. Again, other embodiments of these transmitters are possible, the important point being that the transmitter is capable of generating one or more ultasonic electrical signals on command.

A transducer 11 is provided to transduce the ultrasonic signal provided by transmitter 13 into mechanical vibrations at the same frequency or frequencies. Transducer 18 serves the same function for transmitter 15. Such transducers are well known in the art and may take the form of piezoelectric devices. Importantly, the transducer is mounted on the missile structure to impart surface vibration waves to the missile structure when the transducer is actuated by an ultrasonic signal. The surface waves permeate the entire structure and are capable of detection by a suitable transducer anywhere on the structure. One such transducer 19 is illustrated and may take the form of a piezoelectric device arranged to transduce the sensed surface wave vibrations in the structure to electrical signals at the same frequency.

Transducer 19 is associated with an arming control circuit 16 which fires a fuze 17 in accordance with the information contained in the signals received at the arming control circuit. As noted above in describing the types of conditions which may be sensed by sensors 12 and 14, the conditions under which firing may be initiated may be as simple as the receipt of a particular ground-originated signal and as complex as particular velocity and acceleration conditions.

Another application for the invention is illustrated in FIG. 2 in the form of a bomb. Ultrasonic signalling according to the present invention permits remote control of bomb fuzes using existing bomb racks and unmodified bombs to control or select the fuze function. A bomb rack 21 section of an aircraft is shown supporting a bomb 20 by means of appropriate hooks 24 and eyes 23. One or more ultrasonic transmitters 25 are located in the rack and impart ultrasonic surface wave vibrations to the rack body via transducer 29. These vibrations permeate the entire structure and, through the hook and eye supports, extend to bomb 20. One or more transducers 27 and associated fuzes 28 are located within the bomb, transducers 27 being arranged to sense the ultrasonic surface waves. The fuze is arranged to be activated when its associated transducer senses a particular signal parameter, such as a particular frequency. Each of fuzes 28 may provide a different fuze function so that by selecting the appropriate signal parameter value the operator can select whichever fuze function is desired.

A modification illustrated in FIG. 3 applies the present invention to the selective launching of various rockets supported in a multi-rocket launcher. An aircraft frame includes a rack 31 from which the multi-rocket launcher 32 is supported by hooks 34 and eyes 33. Multiple rockets 35 are disposed in respective tubes of launcher 32 and include transducers 37 and fuzes 36. Transducers 38 and associated launch mechanisms 39 may be located in the individual tubes of the launcher. An ultrasonic transmitter 30, operative under the control of control unit 40, imparts ultrasonic surface vibrations to the frame of the craft via transducer 30a. The vibrations pass through the supporting hook and eye arrangement to launcher 32 and each of the support tubes and rockets 35. In this manner, by activating the appropriate ultrasonic frequencies, individual rockets can be selectively launched and armed.

An arrangement for selectively actuating different launchers, fuzes, or other functions in a rocket, bomb, missile, etc., is illustrated in FIG. 4. A plurality of ultrasonic oscillators 41 are arranged to be individually selected by control switch 42 which passes the ultrasonic signal from the selected oscillator. It should be noted that the connections between the oscillators and control switch may be arranged to permit more than one oscillator to be selected; for example, a plurality of paralleled push button switches may be used with respective oscillators. The passed ultrasonic signal is frequency-modulated by modulator 43 before being applied to transducer 44 which converts the electrical signal into surface waves in the structure.

The frequency modulation imparted by modulator 43 prevents the establishment of permanent nodes in the surface wave vibrations. Specifically, the vibrations set up a complicated standing wave pattern in the structure, the pattern position being dependent upon the ultrasonic signal frequency. In a multi-sensor multi-frequency system, in particular, there is a chance that a sensor transducer may be positioned at a node in the standing wave pattern and therefore fail to sense the transmitted signal. The frequency modulation serves to continuously shift the standing wave pattern so that no sensor can be positioned at a permanent node.

FIG. 5 illustrates the present invention applied to a remotely controlled fuze in an anti-tank gun or a tank gun, or the like, wherein the fuze must be set while the projectile is in the breech. The transmitter-transducer arrangement 52 is mounted directly on the barrel 51 of gun 50. The ultrasonic signal is transmitted to the fuze-transducer combination 55 in shell 54 through the shell case 53 and the shell.

It should be noted that the ultrasonic signal employed in the present invention may be one or more pulses of ultrasonic energy, whereby a pulse code may be employed to effect different functions. In this respect, counters may be employed in the arming or launch control units conventional pulse modulation may be employed at the transmitters.

We wish it to be understood that we do not desire to be limited to the exact details of construction shown and described, for obvious modifications can be made by a person skilled in the art.

We claim:
1. The method of transmitting information from a first location in a structure to one or more remote locations in said structure, said method comprising the steps of:
generating an alternating ultrasonic electrical signal representing said information;
frequency-modulating said electrical signal;
at said first location, transducing said electrical signal to surface wave vibrations in said structure, said surface waves being spatially shifted at the modulation frequency;
at said one or more remote locations, transducing said surface wave vibrations back into an electrical signal.

2. The method according to claim 1 further comprising the step of:
varying the information transmitted by selectively changing the frequency of said alternating electrical signal before said step of frequency-modulating.

3. The method according to claim 1 wherein said structure is a munitions structure and further comprising the step of:
in response to transducing of said vibrations back into an electrical signal at said one remote location, actuating a fuze in said munitions structure.

4. The method according to claim 1 wherein said structure includes a plurality of different fuzes at respective remote locations, and further comprising the steps of:
selectively varying the frequency of said electrical signal, before said step of transducing, in accordance with which of said fuzes is to be activated; and in response to transducing said vibrations into electrical signals at at least one predetermined frequency at each fuze location, activating the fuze at that location.

5. The method according to claim 1 wherein the structure is a gun and the first location is the barrel of the gun and the remote location a projectile in the breech of the gun and further comprising the step of:

in response to transducing of said vibrations back into an electrical signal at said remote location, actuating a fuze in said projectile.

6. The method of transmitting information from a first location in a multiple tube rocket launcher to remote locations in said launcher, each tube corresponding to one of said remote locations and being capable of launching a respective rocket, comprising the steps of:

generating an alternating ultrasonic electrical signal representing said information;

selectively varying the frequency of said electrical signal in accordance with which of said rockets is to be launched; and at said first location, transducing said electrical signal to surface wave vibrations in said multiple tube rocket launcher;

at said one or more romote locations, transducing said surface wave vibrations back into an electrical signal; and in response to transducing said vibrations into electrical signals at least one predetermined frequency at each rocket tube location, launching a rocket from that tube.

7. The method according to claim 6 further comprising the steps of:

frequency-modulating said electrical signal, before said step of transducing, to spatially shift said surface waves at the modulation frequency.

8. The method of transmitting information from a first location in a structure wherein said structure is a guided missile having a plurality of sensors which provide sensor signals to a controller at said first location, to one or more remote locations in said structure, said method comprising the steps of:

in response to reception of one or more predetermined sensor signals at said controller, generating an alternating ultrasonic electrical signal at a predetermined frequency;

at said first location, transducing said electrical signal to surface wave vibrations in said structure;

at said one or more remote locations, transducing said surface wave vibrations back into an electrical signal; and in response to transducing said vibrations back into an electrical signal at said predetermined frequency at a remote location, detonating an explosive device in said missile.

9. The method according to claim 8 further comprising the steps of:

frequency-modulating said electrical signal, before said step of transducing, to spatially shift said surface waves at the modulation frequency.

* * * * *